(12) United States Patent
Arnold et al.

(10) Patent No.: US 8,936,056 B2
(45) Date of Patent: Jan. 20, 2015

(54) HEAVY VEHICLE TREADS/UNDERTREAD

(75) Inventors: Jesse J. Arnold, Simpsonville, SC (US); John Calloway Moreland, Greer, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 63 days.

(21) Appl. No.: 13/142,538

(22) PCT Filed: Dec. 29, 2008

(86) PCT No.: PCT/US2008/088437
§ 371 (c)(1),
(2), (4) Date: Jun. 28, 2011

(87) PCT Pub. No.: WO2010/077232
PCT Pub. Date: Jul. 8, 2010

(65) Prior Publication Data
US 2011/0265923 A1    Nov. 3, 2011

(51) Int. Cl.
*B60C 1/00* (2006.01)
*B60C 11/00* (2006.01)

(52) U.S. Cl.
USPC ........ 152/450; 152/209.5; 152/526; 152/532; 152/537

(58) Field of Classification Search
None
See application file for complete search history.

(56) References Cited

U.S. PATENT DOCUMENTS

| | | | |
|---|---|---|---|
| 5,227,425 A | 7/1993 | Rauline | |
| 5,756,589 A | 5/1998 | Sandstrom | |
| 6,053,226 A | 4/2000 | Agostini | |
| 6,872,769 B2 | 3/2005 | Lukich et al. | |
| 7,378,464 B2 | 5/2008 | Aoki | |
| 2006/0231181 A1 | 10/2006 | Roder et al. | |
| 2008/0121324 A1 | 5/2008 | Cambon et al. | |
| 2009/0186961 A1 | 7/2009 | Araujo Da Silva | |

FOREIGN PATENT DOCUMENTS

| | | | |
|---|---|---|---|
| JP | 2007-177044 | * | 7/2007 |
| WO | WO0073092 A1 | | 5/2000 |

OTHER PUBLICATIONS

International Search Report and Written Opinion for PCT/US2008/88437 dated Feb. 19, 2009.

* cited by examiner

*Primary Examiner* — Justin Fischer
(74) *Attorney, Agent, or Firm* — Frank J. Campigotto

(57) ABSTRACT

Heavy vehicle tire treads and/or undertread constituted at least in part from a rubber composition comprising between 80 and 100 phr of a natural rubber and between 0 and 20 phr of a synthetic polyisoprene rubber, a reinforcement filler comprising a) between 30 and 50 phr of a highly dispersible silica and b) a carbon black in an amount of between (0.75)C phr and (1.25)C phr as determined by the equation C=−0.8Si+44.3, wherein Si is the amount of the highly dispersible silica, a silane coupling agent and a sulfur curing system comprising between 1.5 and 3 phr of free sulfur and between (0.9)A phr and (L 1)A phr of a sulfenamide accelerator, wherein A is determined by a formula that is a function of the sulfur quantity and the silica weight fraction of the total reinforcement filler.

18 Claims, No Drawings

HEAVY VEHICLE TREADS/UNDERTREAD

BACKGROUND OF THE INVENTION

1. Field of the Invention

This invention relates generally to tire treads and more specifically, to heavy vehicle tire treads having a high silica content.

2. Description of the Related Art

Tire wear is of concern to those who must purchase tires because the greater the tire wear, the more expensive it is to operate a vehicle due to the expense of replacing worn tires. This is of more concern to those who operate large fleets of vehicles such as truck fleets or bus lines.

Improving tire wear is often a trade off that must be made against another valued physical property of a tire such as, for example, rolling resistance. The greater the rolling resistance of a tire, the higher the fuel consumption may be and the higher the operating costs.

Selection of reinforcing materials can have an impact on the physical properties of tires. Carbon black has been used for many years as a reinforcement filler of choice. Silica and other so-called white filler have been used also, often providing more desired characteristics than can be achieved with carbon black. An example of silica use as a filler is disclosed in U.S. Pat. No. 5,227,425.

There is a need for improved materials to provide an optimum combination of tire performances.

SUMMARY OF THE INVENTION

Particular embodiments of the present invention provide a heavy vehicle tire having a tread and an undertread, the tread, the undertread or both being constituted at least in part from a material based upon a rubber composition. Other embodiments include a heavy vehicle tire tread based upon the rubber composition. Other embodiments include a tire tread Other embodiments include a tire tread band for bonding to a buffed tire during a re-tread process, the tread band constituted at least in part from the material based up the rubber composition.

Particular embodiments of the present rubber composition may comprise, per 100 parts by weight of rubber, between 80 and 100 phr of a natural rubber and between 0 and 20 phr of a synthetic polyisoprene rubber. The rubber may further comprise a reinforcement filler comprising a) between 30 and 50 phr of a highly dispersible silica and b) a carbon black in an amount of between (0.75)C phr and (1.25)C phr as determined by the equation $$C=-0.8Si+44.3,$$

wherein Si is the amount of the highly dispersible.

Other components may include a silane coupling agent and a sulfur curing system comprising between 1.5 and 3 phr of free sulfur and between (0.9)A phr and (1.1)A phr of a sulfenamide accelerator, wherein A is determined by the formula $$A=(0.0059S^{-1.45}+0.0045Y)(MW),$$

wherein S is the quantity (phr) of the free sulfur, Y is a weight fraction of the silica reinforcement filler based on the total weight of the reinforcement filler and MW is a molecular weight of the sulfenamide accelerator.

The foregoing and other objects, features and advantages of the invention will be apparent from the following more detailed descriptions of particular embodiments of the invention.

DETAILED DESCRIPTION OF PARTICULAR EMBODIMENTS

Particular embodiments of the present invention include rubber compositions, articles, including tire treads and undertread and especially heavy vehicle tire treads and undertread, and methods for making and using the rubber compositions and the articles. The rubber compositions include a natural rubber with both silica and carbon black as reinforcement filler. Other embodiments may further include a synthetic polyisoprene rubber. The rubber compositions are cured or curable with a sulfur-based vulcanization system using a sulfenamide accelerator and a silane coupling agent. The inventors have discovered that by adjusting the proportion of sulfur to accelerator and the proportion of silica to carbon black, the wear property of heavy vehicle tire treads and/or undertread made of the resulting rubber composition can be nearly maintained while improving the rolling resistance of the tire.

Those embodiments that include "heavy vehicle tire treads and/or undertread" are particularly suitable for use on "heavy vehicles" such as, for example, truck tires, bus tires, subway train tires, tractors, trailers, aircraft tires, agricultural, earthmover and other off-the-road (OTR) tires. The "heavy vehicle tire treads and/or undertread" as used herein may include those of new tires, those on tires that have been re-treaded and the tread bands (cured or uncured) that can be applied to buffed tires during the re-tread process. Therefore particular embodiments of the present invention are not directed to passenger car tires and other light duty tires. The undertread as used herein is defined as the elastomer composition located between the belt package and the tread.

Heavy vehicles tires can sometimes be classified as to their use. For example, truck tires may be classified as drive tires (those that are powered by the truck engine) and steer tires (those that are used to steer the truck). The tires on the trailer of a tractor-trailer rig are also classified separately. While embodiments of the present invention are recognized as being suitable for each type of heavy vehicle tires, other embodiments are especially suited and limited to the drive tires of a tractor as used in a tractor-trailer rig.

Particular embodiments of the present invention include heavy vehicle tire treads and/or undertread constituted at least in part from a material based upon a rubber composition reinforced with silica and carbon black. The term "based upon" as used herein recognizes that the treads or other rubber articles are made of vulcanized or cured rubber compositions that were, at the time of their assembly, uncured. The cured rubber composition is therefore "based upon" the uncured rubber composition. In other words, the cross-linked rubber composition is based upon the cross-linkable rubber composition.

It is recognized that in particular embodiments of the present invention the entire tread and/or the entire undertread may be constituted from the rubber composition disclosed herein while in other embodiments only portions of the tread and/or portions of the undertread may be constituted from the rubber composition or combinations of such thereof. For example in particular embodiments only a portion of tread blocks on a tread may be made of the disclosed rubber composition while in other embodiments only portions of individual tread blocks may be made of the disclosed rubber composition. The tread blocks of the tread may be of the composition and/or in other embodiments only the tread base may be made of the composition. The undertread may be of the disclosed composition or in other embodiments not of the disclosed composition.

Particular embodiments of the rubber composition disclosed herein have an elastomer composition that includes just natural rubber or a combination of natural rubber and a synthetic polyisoprene rubber. The synthetic polyisoprenes include, for example, synthetic cis-1,4 polyisoprene, which may be characterized as possessing cis-1,4 bonds at more than 90 mol. % or alternatively, at more than 98 mol. %. Particular embodiments of the present invention have a natural rubber content of between 80 and 100 parts by weight per hundred parts by weight of the total elastomer (phr) or alternatively at least 85 phr of natural rubber, at least 90 phr of natural rubber, at least 95 phr of natural rubber or 100 phr of natural rubber.

Particular embodiments of the rubber composition disclosed herein include no other highly unsaturated diene elastomers other than natural rubber and/or synthetic polyisoprene rubber. Other embodiments may include no other unsaturated diene elastomers and/or any other essentially saturated diene elastomers. Diene elastomers or rubber is understood to mean those elastomers resulting at least in part (i.e., a homopolymer or a copolymer) from diene monomers (monomers bearing two double carbon-carbon bonds, whether conjugated or not). Essentially unsaturated diene elastomers are understood to mean those diene elastomers that result at least in part from conjugated diene monomers, having a content of members or units of diene origin (conjugated dienes) that are greater than 15 mol. %.

Thus, for example, diene elastomers such as butyl rubbers, nitrile rubbers or copolymers of dienes and of alpha-olefins of the ethylene-propylene diene terpolymer (EPDM) type or the ethylene-vinyl acetate copolymer type do not fall within the preceding definition, and may in particular be described as "essentially saturated" diene elastomers (low or very low content of units of diene origin, i.e., less than 15 mol. %). Particular embodiments of the present invention include no essentially saturated diene elastomers.

Within the category of essentially unsaturated diene elastomers are the highly unsaturated diene elastomers, which are understood to mean in particular diene elastomers having a content of units of diene origin (conjugated dienes) that is greater than 50 mol. %.

Particular embodiments of the rubber composition disclosed herein include both carbon black and silica as reinforcement fillers. Indeed it has been determined that the proportion of silica to the carbon black is an important variable for achieving the wear properties of heavy vehicle tire treads made of such rubber compositions without sacrificing other important properties such as rolling resistance. The silica may be added to the rubber composition in an amount of between 30 and 50 phr or alternatively between 30 and 45 phr, 35 and 45 phr or 40 and 45 phr. Silica added in quantities outside these amounts negatively impact the physical properties (wear and/or rolling resistance) of heavy vehicle tire treads and/or undertread made from the disclosed rubber composition.

The silica used in particular embodiments of the rubber composition may be any reinforcing silica known to one having ordinary skill in the art, in particular any precipitated or pyrogenic silica having a BET surface area and a specific CTAB surface area both of which are less than 450 m$^2$/g or alternatively, between 30 and 400 m$^2$/g. Particular embodiments include a silica having a CTAB of between 80 and 200 m$^2$/g, between 100 and 190 m$^2$/g, between 120 and 190 m$^2$/g or between 140 and 180 m$^2$/g. The CTAB specific surface area is the external surface area determined in accordance with Standard AFNOR-NFT-45007 of November 1987.

Particular embodiments of the rubber compositions constituting the heavy vehicle tire treads and/or undertread have a BET surface area of between 60 and 250 m$^2$/g or alternatively, of between 80 and 200 m$^2$/g. The BET specific surface area is determined in known manner, in accordance with the method of Brunauer, Emmet and Teller described in "The Journal of the American Chemical Society", vol. 60, page 309, February 1938, and corresponding to Standard AFNOR-NFT-45007 (November 1987).

The silica used in particular embodiments may be further characterized as having a dibutylphthlate (DBP) absorption value of between 100 and 300 ml/100 g or alternatively between 150 and 250 ml/100 g.

Highly dispersible precipitated silicas (referred to as "HDS") are used exclusively in particular embodiments of the disclosed rubber composition, wherein "highly dispersible silica" is understood to mean any silica having a substantial ability to disagglomerate and to disperse in an elastomeric matrix. Such determinations may be observed in known manner by electron or optical microscopy on thin sections. Examples of known highly dispersible silicas include, for example, Perkasil KS 430 from Akzo, the silica BV3380 from Degussa, the silicas Zeosil 1165 MP and 1115 MP from Rhodia, the silica Hi-Sil 2000 from PPG and the silicas Zeopol 8741 or 8745 from Huber.

Carbon black, which is an organic filler, is well known to those having ordinary skill in the rubber compounding field. As noted previously, the rubber composition disclosed herein includes both silica and carbon black as reinforcing fillers. The carbon black included in the rubber composition disclosed herein is added in an amount of between (0.75)C phr and (1.25)C phr as determined by the following Equation (1):

$$C = -0.8Si + 44.3, \quad (1)$$

wherein Si is the amount (phr) of the highly dispersible silica. Alternatively, the carbon black may be added in an amount of between 0.8C and 1.20C, 0.85C and 1.15C phr, 0.9C and 1.1C phr, 0.95C phr and 1.05C phr, between 0.97C phr and 1.03C phr or in the amount of C phr.

Suitable carbon blacks are any carbon blacks, in particular the blacks of the type HAF, ISAF and SAF, which are conventionally used in tires, and particularly in treads. Non-limitative examples of carbon blacks include, for example, the N115, N134, N234, N299, N330, N339, N343, N347 and N375 carbon blacks. For heavy vehicle tire treads, particular embodiments suitable carbon blacks may be limited to those in the N100 through N300 series of carbon blacks.

In addition to the silica added to the rubber composition, a proportional amount of a silane coupling agent is also added to the rubber composition. The silane coupling agent is a sulfur-containing organosilicon compound that reacts with the silanol groups of the silica during mixing and with the elastomers during vulcanization to provide improved properties of the cured rubber composition. A suitable coupling agent is one that is capable of establishing a sufficient chemical and/or physical bond between the inorganic filler and the diene elastomer; which is at least bifunctional, having, for example, the simplified general formula "Y-T-X", in which: Y represents a functional group ("Y" function) which is capable of bonding physically and/or chemically with the inorganic filler, such a bond being able to be established, for example, between a silicon atom of the coupling agent and the surface hydroxyl (OH) groups of the inorganic filler (for example, surface silanols in the case of silica); X represents a functional group ("X" function) which is capable of bonding physically and/or chemically with the diene elastomer, for example by means of a sulfur atom; T represents a divalent organic group making it possible to link Y and X.

Any of the organosilicon compounds that contain sulfur and are known to one having ordinary skill in the art are useful for practicing embodiments of the present invention. Examples of suitable silane coupling agents having two atoms of silicon in the silane molecule include 3,3'-bis(triethoxysilylpropyl) disulfide and 3,3'-bis(triethoxy-silylpropyl) tetrasulfide (known as Si69). Both of these are available commercially from Degussa as X75-S and X50-S respectively, though not in pure form. Degussa reports the molecular weight of the X50-S to be 532 g/mole and the X75-S to be 486 g/mole. Both of these commercially available products include the active component mixed 50-50 by weight with a N330 carbon black. Other examples of suitable silane coupling agents having two atoms of silicon in the silane molecule include 2,2'-bis(triethoxysilylethyel) tetrasulfide, 3,3'-bis(tri-t-butoxy-silylpropyl) disulfide and 3,3'-bis(di t-butylmethoxysilylpropyl) tetrasulfide. Examples of silane coupling agents having just one silicon atom in the silane molecule include, for example, 3,3'(triethoxysilylpropyl) disulfide and 3,3' (triethoxy-silylpropyl) tetrasulfide. The amount of silane coupling agent can vary over a suitable range as known to one having ordinary skill in the art. Typically the amount added is between 7 wt. % and 15 wt. % or alternatively between 8 wt. % and 12 wt. % or between 9 wt. % and 11 wt. % of the total weight of silica added to the rubber composition.

The rubber composition disclosed herein is cross-linked or cross-linkable using a sulfur curing system that includes free sulfur and a sulfenamide accelerator in a proportional amount. Suitable free sulfur includes, for example, pulverized sulfur, rubber maker's sulfur, commercial sulfur, and insoluble sulfur. The amount of free sulfur included in the rubber composition may range between 1.5 and 3 phr or alternatively between 1.6 and 2.8 phr, between 1.6 and 2.5 phr, between 1.75 and 3 phr or between 2 and 2.6 phr.

The sulfenamide accelerator is added in a proportional amount to the amount of free sulfur added in the curing system. Adding a quantity of the sulfenamide accelerator and/or an amount of free sulfur outside the ranges disclosed herein negatively impacts the physical properties (wear and/or rolling resistance) of heavy vehicle tire treads made of the rubber composition. Particular embodiments of the rubber composition disclosed here include between (0.9)A phr and (1.1)A phr of a sulfenamide accelerator, wherein A is determined by the following Equation (2):

$$A = (0.0059 S^{-1.45} + 0.0045 Y)(MW) \quad (2)$$

where S is the quantity (phr) of the free sulfur, Y is the weight fraction of the silica reinforcement filler based on the total weight of the reinforcement filler and MW is the molecular weight of the sulfenamide accelerator. Alternatively, the sulfenamide accelerator may be added in an amount of between 0.95A phr and 1.05A phr, between 0.97A phr and 1.03A phr or in the amount of A phr. It should be noted that the inventors have discovered that in order to obtain the surprising results of improved wear resistance without significantly impacting other physical properties, the amount of the sulfenamide accelerator added to the rubber composition is a function not only of the amount of sulfur added to the composition but also the amount of silica added to the composition as the silica weight fraction of the total weight of the reinforcement filler.

Sulfenamide accelerators are well known in the art. Examples of suitable sulfenamide accelerators include n-cyclohexyl-2-benzothiazole sulfenamide (CBS), N-tert-butyl-2-benzothiazole Sulfenamide (TBBS), N-Oxydiethyl-2-benzthiazolsulfenamide (MBS) and N'-dicyclohexyl-2-benzothiazolesulfenamide (DCBS). Particular embodiments utilize CBS solely as the sulfenamide accelerator.

For example, to determine the quantity "A" of formula (1) in an embodiment that include CBS (MW of 264 g/mole) as the sulfenamide accelerator and further includes 2.3 phr of free sulfur, 41.1 phr of silica and 13.2 phr of carbon black, "A" would be calculated to be $[(0.0059)(2.3)^{-1.45} + (0.0045)(0.756)]*264 = 1.36$ phr by weight of the sulfenamide accelerator.

Particular embodiments of the rubber composition disclosed herein include no processing oil. Such oils are well known to one having ordinary skill in the art, are generally extracted from petroleum, and are classified as being paraffinic, aromatic or naphthenic type processing oil and including MES and TDAE oils. Some embodiments of the rubber composition may include an elastomer, such as a synthetic polyisoprene, that has been extended with one or more such processing oils but such oil is limited in the rubber composition as being no more than 10 phr of the total elastomer content of the rubber composition or alternatively, no more than 8 phr, no more than 6 phr or no more than 4 phr. Likewise other rubber compositions of particular embodiments in accordance with the present invention that do not include an extended elastomer may include no more than the same amount of processing oils as might be contained in an extended elastomer as noted above.

Particular embodiments of the rubber composition disclosed herein include no plasticizing resins. Such resins are well known to those having ordinary skill in the art and are generally hydrocarbon based, often being petroleum based. However, the invention overall is not so limited.

Other additives can be added to the rubber composition disclosed herein as known in the art. Such additives may include, for example, some or all of the following: antidegradants, antioxidants, fatty acids, waxes, stearic acid, zinc oxide and other accelerators. Examples of antidegradants and antioxidants include 6PPD, 77PD, IPPD and TMQ and may be added to rubber compositions in an amount of from 0.5 and 5 phr. Zinc oxide may be added in an amount of between 1 and 6 phr or 2 and 4 phr. Waxes may be added in an amount of between 1 and 5 phr.

Accelerators are used to control the time and/or temperature required for vulcanization and to improve the properties of the cured rubber composition. As noted above, the primary accelerator in the rubber composition disclosed herein is a sulfenamide, which is added in an amount that is proportional to the amount of sulfur added. Combinations of accelerators are often useful to improve the properties of the cured rubber composition and particular embodiments may include the addition of a secondary accelerator.

Particular embodiments include the use of a moderately fast accelerator such as, for example, diphenylguanidine (DPG), triphenyl guanidine (TPG), diorthotolyl guanidine (DOTG), o-tolylbigaunide (OTBG) or hexamethylene tetramine (HMTA). Such accelerators may be added in an amount of up to 4 phr, between 0.5 and 3 phr, between 0.5 and 2.5 phr or between 1 and 2 phr. Particular embodiments may exclude the use of fast accelerators and/or ultra-fast accelerators such as, for example, the fast accelerators: disulfides and benzothiazoles; and the ultra-accelerators: thiurams, xanthates, dithiocarbamates and dithiophosphates.

The invention is further illustrated by the following examples, which are to be regarded only as illustrations and not delimitative of the invention in any way. The properties of the compositions disclosed in the examples were evaluated as described below.

Moduli of elongation (MPa) were measured at 10% (MA10) and 100% (MA 100) at a temperature of 23° C. based on ASTM Standard D412 on dumb bell test pieces. The measurement were taken in the second elongation; i.e., after an accommodation cycle. These measurements are secant moduli in MPa, based on the original cross section of the test piece.

Hysteresis losses (HL) were measured in percent by rebound at 60° C. at the sixth impact in accordance with the following equation:

$$HL(\%) = 100(W_0 - W_1)/W_1,$$

where $W_0$ is the energy supplied and $W_1$ is the energy restored.

Dynamic characteristics of the materials were measured on an MTS 831 Elastomer Test System in accordance with ASTM D5992. The response of a sample of vulcanized material (cylindrical test piece of a thickness of 4 mm and a section of 400 mm$^2$), subjected to an alternation single sinusoidal shearing stress, at a frequency of 10 Hz and at 80° C., is recorded. Scanning is effected at an amplitude of deformation of 0.1 to 50% (outward cycle), then of 50% to 0.1% (return cycle). The maximum value of the tangent of the loss angle tan delta (max tan δ) at 80° C. was determined during the return cycle.

The tear resistance indices are measured at 100° C. The breaking load (BL) in N/mm of thickness and the elongation at break (EB) in percentage are measured on a test piece of dimensions 10×142×2.5 mm notched with 3 notches that each have a depth of 3 mm. The tear resistance index is then provided by the following equation (2):

$$TR = (BL \ast EB)/100. \tag{2}$$

The tire testing results are provided as relative performance indices, such results being relative to a reference index 100 characterizing a "control" tire. Therefore a performance index greater than this base 100 indicates that a performance for a particular tire is superior to that of the corresponding "control" tire.

The rolling resistance of each of the tires tested was measured by running on a test drum, at an ambient temperature of 25° C., under a load of 2800 kg and at a speed of 90 km/h, the internal pressure of the tire being 8.6 bar.

The wear resistance or endurance of each tire was determined by means of a relative wear index which is a function of the height of rubber remaining, after running the tires on the steer axle of a truck on a winding road circuit, for a total of 40,000 miles. This relative wear index was obtained by comparing the height of rubber remaining on a tread according to the invention with the height of rubber remaining on a "control" tread, which by definition has a wear index of 100.

Traction was tested by mounting the tire on a truck having an instrumented drive axle. The tires were tested at ambient temperature conditions with 1.5 mm nominal water depth on the road surface. The conditions of the test were on polished concrete at 32 and 64 km/h and on asphalt at 32 and 97 km/h.

During each test, a braking force (Fx) was applied and measured locking the wheel rotation, i.e., the wheel stopped rotating. Slip occurs when, at the footprint, the tire's angular velocity of the tire (O) is less than its free-rolling angular velocity (Oo). The slip ratio (SR) generally represents the difference between the two velocities, and may be expressed as SR=(O/Oo)−(Oo/Oo). For example, when the tire becomes locked, the rotational velocity is zero and the slip ratio is −1.

During the test, Mu values for were calculated for particular tire angular velocities (slip ratios) until the tire became locked due to braking forces. Mu is determined by dividing the braking force by the constant vertical load applied to each tire. Using the average Mu value between 5% and 45% slip for each tire, the Mu values for each of the tires were normalized by dividing each by the average Mu value for the Witness 1 tire.

EXAMPLE 1

Elastomer formulations were prepared using the components shown in Table 1 and using procedures well known to one having ordinary skill in the art. The amount of each component making up the elastomer formulations shown in Table 1 are provided in parts per hundred parts by weight (phr) of the elastomer. The "Other" components listed in Table 1 for the formulations F1 through F3 included curative and antidegradant components such as ZnO, stearic acid, 6PPD, TMQ, DPG and wax. All of these materials were added in typical amounts as known to those having ordinary skill in the art. The witness tire was an off-the-shelf Michelin truck tire.

The carbon blacks used in the formulations were as follows: Witness, N299; F1, ECORAX 1990 available from Evonik Industries; F2, SR129 available from Sid Richardson Carbon Co.; F3, N234. The highly dispersible silicas used in the formulations were as follows: F2, Zeosil Premium 200 MP available from Rhodia; F1, F3, Zeosil 1165 MP available from Rhodia. Zeosil 200 Premium MP may be characterized as being a highly dispersible silica having BET surface area and a CTAB of 230 m$^2$/g and 196 m$^2$/g respectively. Zeosil 1165 MP may be characterized as being a highly dispersible silica having BET surface area and a CTAB of 160 m$^2$/g and 155 m$^2$/g respectively.

TABLE 1

Physical Properties of Elastomer Formulations

|  | Witness | F1 | F2 | F3 |
| --- | --- | --- | --- | --- |
| Elastomer Composition | | | | |
| Natural Rubber | 100 | 100 | 100 | 100 |
| Polybutadiene | | | | |
| Carbon black, phr | 45 | 13.2 | 13.2 | 10 |
| Silica | | 41.1 | 41.1 | 40 |
| Silane Coupling Agent, Si69 | | 4.11 | 4.95 | 4 |
| CBS | 0.8 | 1.38 | 1.38 | 1.38 |
| sulfur | 1.5 | 2.3 | 2.3 | 2.3 |
| Other | 9.2 | 10.2 | 10.2 | 9.05 |
| Measured Properties | | | | |
| MA10 (MPa) | 4.8 | 3.9 | 3.7 | 4.4 |
| MA100 (MPa) | 2.02 | 1.98 | 1.78 | 2.10 |
| Max Tan Delta | 0.11 | 0.061 | .077 | 0.074 |
| Hysteresis Loss (%) | 18.6 | 11.1 | 12.8 | 12.3 |
| Tear Resistance Index @ 100° C. | 137 | 269 | 350 | 188 |
| Tear Resistance @ 100° C., (N/mm) | 46 | 67 | 70 | 53 |
| Tear Resistance @ 100° C., Elongation (%) | 298 | 402 | 500 | 353 |
| Tire Wear | 100 | 91/100 | 97 | 92 |
| Rolling Resistance | 100 | 110 | 106 | 107 |
| Traction | 100 | 103 | 105 | |

The elastomer formulations were prepared by mixing the rubber, silica, coupling agent and DPG components given in Table 1 in a Banbury mixer operating at 65-70 RPM for about 45 seconds, then adding the carbon black and then lowering the 50-55 RPM for about 1.8 minutes. The mixture was then cooled and transferred to a mill having two cylinders that operated at a speed of 30 RPM. The vulcanizing agents were added and mixing continued until the vulcanizing agents were well dispersed, which was for up to 10 minutes milling time. In the case of F1 and F2 only, the mixture was added back to the Banbury mixer for further processing. The Banbury mixer was operated at a speed of between 20-40 RPM for about 2.5 minutes during this second stage of mixing.

The rubber compositions were rolled into sheets and cured for 20 minutes at a temperature of 150° C. for all the materials except for Witness 1, which was cured at 150° C. for 25 minutes. The cured sheets were then cut into testing pieces suitable for the testing methods utilized to determine the physical characteristics of the examples.

For the tire testing, tires were produced having treads made of the rubber compounds shown in Table 1. Testing was conducted as described above with the test results shown in Table 1.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A heavy vehicle tire having a tread and an undertread, the tread, the undertread or both being constituted at least in part from a material based upon a rubber composition, the rubber composition comprising, per 100 parts by weight of rubber:
   between 80 and 100 phr of a natural rubber;
   between 0 and 20 phr of a synthetic polyisoprene rubber;
   a reinforcement filler comprising a) a highly dispersible silica in an amount of between 30 and 45 phr and b) a carbon black in an amount of between (0.75)C phr and (1.25)C phr as determined by the equation $C=-0.8Si+44.3$, wherein Si is the amount (phr) of the highly dispersible silica;
   a silane coupling agent; and
   a sulfur curing system comprising between 1.5 and 3 phr of free sulfur and between (0.9)A phr and (1.1)A phr of a sulfenamide accelerator, wherein A is determined by the formula $A=(0.0059S^{-1.45}+0.0045Y)(MW)$, wherein S is the quantity (phr) of the free sulfur, Y is a weight fraction of the silica reinforcement filler based on the total weight of the reinforcement filler and MW is a molecular weight of the sulfenamide accelerator.

2. The heavy vehicle tire of claim 1, wherein the rubber composition comprises 100 phr of the natural rubber and 0 phr of the synthetic polyisoprene rubber.

3. The heavy vehicle tire of claim 1, wherein the rubber composition comprises 100 phr of the natural rubber and the synthetic polyisoprene rubber.

4. The heavy vehicle tire of claim 1, wherein the sulfenamide accelerator is CBS.

5. The heavy vehicle tire of claim 1, wherein the reinforcement filler comprises between 30 and 45 phr of the highly dispersible silica.

6. The heavy vehicle tire of claim 1, wherein the sulfur curing system comprises between 1.6 and 2.8 phr of free sulfur.

7. The heavy vehicle tire of claim 1, wherein the sulfur curing system comprises between 0.97A and 1.03A phr of the sulfenamide accelerator.

8. The heavy vehicle tire of claim 1, wherein the carbon black is added in an amount of between 0.9C and 1.1C phr of carbon black.

9. A heavy vehicle tire tread constituted at least in part from a material based upon a rubber composition, the rubber composition comprising, per 100 parts by weight of rubber:
   between 80 and 100 phr of a natural rubber;
   between 0 and 20 phr of a synthetic polyisoprene rubber;
   a reinforcement filler comprising a) a highly dispersible silica in an amount of between 30 and 45 phr and b) a carbon black in an amount of between (0.75)C phr and (1.25)C phr as determined by the equation $C=-0.8Si+44.3$, wherein Si is the amount (phr) of the highly dispersible silica;
   a silane coupling agent; and
   a sulfur curing system comprising between 1.5 and 3 phr of free sulfur and between (0.9)A phr and (1.1)A phr of a sulfenamide accelerator, wherein A is determined by the formula $A=(0.0059S^{-1.45}+0.0045Y)(MW)$, wherein S is the quantity (phr) of the free sulfur, Y is a weight fraction of the silica reinforcement filler based on the total weight of the reinforcement filler and MW is a molecular weight of the sulfenamide accelerator.

10. The heavy vehicle tire tread of claim 9, wherein the rubber composition comprises 100 phr of the natural rubber and 0 phr of the synthetic polyisoprene rubber.

11. The heavy vehicle tire tread of claim 9, wherein the rubber composition comprises 100 phr of the natural rubber and the synthetic polyisoprene rubber.

12. The heavy vehicle tire tread of claim 9, wherein the sulfenamide accelerator is CBS.

13. The heavy vehicle tire tread of claim 9, wherein the reinforcement filler comprises between 30 and 45 phr of the highly dispersible silica.

14. The heavy vehicle tire tread of claim 9, wherein the sulfur curing system comprises between 1.6 and 2.8 phr of free sulfur.

15. The heavy vehicle tire tread of claim 9, wherein the sulfur curing system comprises between 0.97A and 1.03A phr of the sulfenamide accelerator.

16. The heavy vehicle tire tread of claim 9, wherein the carbon black is added in an amount of between 0.97C and 1.03C phr of carbon black.

17. The heavy vehicle tire tread of claim 9, wherein the tire tread is a tread band for bonding to a buffed tire during a re-tread process.

18. A heavy vehicle tire having a tread and an undertread, the tread being constituted at least in part from a material based upon a rubber composition, the rubber composition comprising, per 100 parts by weight of rubber:
- between 80 and 100 phr of a natural rubber;
- between 0 and 20 phr of a synthetic polyisoprene rubber;
- a reinforcement filler comprising a) a highly dispersible silica in an amount of between 30 and 45 phr and b) a carbon black in an amount of between (0.75)C phr and (1.25)C phr as determined by the equation $$C = -0.8Si + 44.3,$$

wherein Si is the amount (phr) of the highly dispersible silica;
- a silane coupling agent; and
- a sulfur curing system comprising between 1.5 and 3 phr of free sulfur and between (0.9)A phr and (1.1)A phr of a sulfenamide accelerator, wherein A is determined by the formula $$A = (0.0059S^{-1.45} + 0.0045Y)(MW),$$

wherein S is the quantity (phr) of the free sulfur, Y is a weight fraction of the silica reinforcement filler based on the total weight of the reinforcement filler and MW is a molecular weight of the sulfenamide accelerator.

* * * * *